United States Patent
Dubberley et al.

(10) Patent No.: US 8,504,299 B2
(45) Date of Patent: Aug. 6, 2013

(54) FUZZY CLUSTERING OF OCEANIC PROFILES

(75) Inventors: John R. Dubberley, New Orleans, LA (US); Michael Carnes, Pearl River, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 133 days.

(21) Appl. No.: 12/957,602

(22) Filed: Dec. 1, 2010

(65) Prior Publication Data

US 2012/0143865 A1  Jun. 7, 2012

(51) Int. Cl.
*G01W 1/00* (2006.01)

(52) U.S. Cl.
USPC .......................................................... 702/3

(58) Field of Classification Search
None
See application file for complete search history.

(56) References Cited

U.S. PATENT DOCUMENTS

| | | | | |
|---|---|---|---|---|
| 7,842,507 B1* | 11/2010 | Byrne | ............................ | 436/133 |
| 2004/0230519 A1* | 11/2004 | Parker | ............................ | 705/37 |
| 2005/0286345 A1* | 12/2005 | Arvelo et al. | ................. | 367/131 |
| 2008/0013404 A1* | 1/2008 | Acker et al. | ..................... | 367/88 |
| 2008/0177474 A1* | 7/2008 | Clayson et al. | ................... | 702/3 |
| 2009/0067290 A1* | 3/2009 | Londo et al. | ..................... | 367/89 |
| 2009/0187369 A1* | 7/2009 | Kang et al. | ..................... | 702/130 |
| 2010/0082264 A1* | 4/2010 | Barron et al. | .................. | 702/25 |
| 2010/0106724 A1* | 4/2010 | Anderson | ..................... | 707/737 |

OTHER PUBLICATIONS

Helber et al., "Mixed Layer Depth in the Aegean, Marmara, Black and Azov Seas: Part II: Relation to the Sonic Layer Depth," Mar. 3, 2009, Journal of Marine Systems 78 (2009), S181-S190.*
U.S. Appl. No. 12/552,495, Roger W. Meredith et al., Robust Adaptive Data Clustering in Evolving Environments, filed Sep. 2, 2009.
Fuzzy clustering of oceanographic sound speed profiles for acoustic characterization, John Dubberley NRL Code 7440.1, Robert Zingarelli NRL Code 7170, Published in Proceedings of 9th European Conference on Underwater Acoustics, Jun. 2008.
Eugene Podeszwa, "Sound Speed Profiles for the North Atlantic Ocean" NUSC Technical Document 5447, Newport, Rhode Island, 1976.
M. S. Moustafa and M. D. Mandelberg, "Oceanic Provincing Through Cluster Analysis" Proc. IEEE Oceans 1991. IEEE Press, Piscataway, NJ 1991. p. 478-481.
S. B. Hooker, N.W. Rees, and J Aiken, "An objective methodology for identifying oceanic provinces". Progress in Oceanography 45 Pergamon Press, 2000 p. 313-338.
Carol Anne Clayson and Lakshmi Kantha, On Turbulence and Mixing in the Free Atmosphere Inferred from High-Resolution Soundings, Journal of Atmospheric and Oceanic Technology, vol. 25, Jun. 2008, pp. 836 and 837.

* cited by examiner

*Primary Examiner* — Charles Kim
*Assistant Examiner* — Grace Park
(74) *Attorney, Agent, or Firm* — Amy L. Ressing; Kathleen Chapman

(57) ABSTRACT

System and method to partition littoral regions by profiles of specific parameters using fuzzy c-mean clustering. Fuzzy cluster partitions assign each datum to a set of data clusters such that the sum cluster membership probability of the point is equal to unity. Partial memberships can supply information about transition areas from one cluster to another.

8 Claims, 2 Drawing Sheets

FUZZY CLUSTERING OF OCEANIC PROFILES

BACKGROUND

The present teachings relate to clustering of data profiles such as, but not limited to, oceanic profiles.

Automatic oceanographic profile provincing (grouping by similar chosen parameters) has been done since the early 1970's, but mainly for deep water. The profiles were compared point by point so all profiles had to contain data down to a set depth, usually in excess of 200 meters. For an oceanographic area of interest, for example a two-degree square box in a littoral region, temperature profiles can vary over time and place widely throughout the large number of historical measurements available. It may be difficult to get an understanding of the underlying environmental forcing mechanisms through inspection of raw data. A previous tool, known as Nydis, allowed the user to set the regional boundary and seasonal time periods by hand. The resulting clusters of profiles were then viewed by the oceanographer together with average profiles and three standard deviation lines shown. The oceanographer would then move the boundaries and seasons and iterate until the oceanographer was satisfied with the results. Depending on the area, this process could take several days. Dividing the data into areas and seasons of similar profiles can shed light on environmental variability and forcing functions of the area of interest. In existing systems, parameters of the data are sampled and then grouped. For example the Naval Underwater Systems Center groups deep water data by temperature profile similarity at particular depths. Cluster analysis has been used to examine sound speed profiles in the Gulf of Alaska. For this data analysis, data points were forced into clusters by minimizing the sum of over each element in a set of predetermined size clusters.

$$d_{rs} = \text{sqrt}(\Sigma_{I=1,n}(c_{ri} - c_{si})^2) \quad (1)$$

In equation (1), d is the distance between sound-speed profiles and $c_{ri}$, $c_{si}$ are the respective sound-speeds at the $I^{th}$ depth. These clusters were then be grouped repeatedly by the same method until all points were in one set. The level of clustering the data seem to naturally cluster on can be determined. This method is commonly used in deep water where generally after a certain depth all profiles are similar and therefore can be universally trimmed to that depth, causing the profiles to be comparable at all points. Traditional automatic clustering algorithms were developed for deep water physical oceanographic profiles. The clustering algorithms clustered properties, for example, by matching each historical profile in turn to the closest unmatched profile in the data set, then matching these groupings until the desired number of clusters was created. In shallow water however, point by point comparison is not generally possible given the common occurrence of significant differences below the depth of the shallowest profile in the data.

When random points are clustered on a page by eye, they are clustered in the 2-D coordinates of up-down versus right-left. Each profile parameter is considered a dimension in the solution space, so each profile is a vector in the solution space with coordinates of the parameter values of the profile. In previous work these profile parameters might be, for example, surface temperature, temperature at fifty meters, temperature at one hundred meters, temperature at two hundred meters, etc. It is desirable to use different types of profile parameters to enable shallow water studies. Thus, it is desirable to perform the automatic clustering of oceanographic profiles spatially, temporally, and by specific profile parameters. It is also desirable to identify regions and seasons where oceanographic parameters are consistent. What is needed is fuzzy clustering for specific parameters to enable enhanced oceanographic studies. What is further needed is to province oceanographic profiles into regions and local seasons according to their oceanographic parameters using sets of profiles taken in water significantly shallower than 200 meters.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The system and method of the present teachings use fuzzy clustering of data profiles to create clusters having centroids on the following physical oceanographic parameters: one-meter temperature, median temperature, surface duct depth, and normalized slope magnitude. Normalized slope magnitude is computed by summing the magnitude of the difference in temperature between each meter of depth and dividing that sum by the number of meter steps. These parameters are possible to determine for all profiles no matter how large. After the parameters are chosen, a fuzzy clustering algorithm can use a minimum distance calculation to determine how the profiles should be grouped into clusters in the N-dimensional solution space. The fuzzy clustering algorithm can assign, after the centroids are created, each of the data profiles a percentage membership greater than zero in each cluster. Each data profile has a total membership of one. The system and method can include a thresholding function that can determine which, if any, cluster holds the profile. After the profiles have been clustered, each clustered profile can be aggregated as a group of multiple parameter profiles which can be provided for, for example, display. These displays can also include an average of the profile, an average of the profile plus-or-minus a given number of standard deviations, and a canonical profile. The canonical profile is the profile with the highest cluster membership value for that cluster. The system and method can also produce plots of the clustered profiles on a map using, for example, colored symbols to denote membership in the corresponding clusters.

In the present embodiment, data points can have partial memberships in clusters, and the system and method can determine the degree of membership of each data point in each cluster. Each data point is not required to belong to a particular cluster. The sum of the memberships for each data point equals unity and the data point has a measurable membership in each cluster. In the system and method of the present embodiment, parameter vectors are assigned to each data profile. The system and method determine a best set of values to describe the profiles with this vector.

The system for clustering data of the present teachings can include, but is not limited to including, a filter filtering data profiles according to pre-selected criteria, a fuzzy cluster processor creating fuzzy clusters around normalized slope magnitude profiles based on the filtered data profiles, a membership processor computing percent memberships in the fuzzy clusters, and an aggregate processor aggregating a group of multiple parameter profiles of the fuzzy clusters. The fuzzy cluster processor, the membership processor, and the aggregate processor can provide the fuzzy clusters, the computed percent memberships, and the aggregated group in a computer-readable format. The system can optionally include a missing salinity values processor determining missing sound speed values of the one-meter temperature profiles. The fuzzy cluster processor can apply the missing salinity values to create the needed sound speed values for the fuzzy clusters. The system can further optionally include a graphical user interface receiving the pre-selected criteria and the data profiles. The graphical user interface can provide the computer-readable format as at least one graphical display.

The method for clustering data of the present teachings can include, but is not limited to including, the steps of filtering data profiles according to pre-selected criteria, creating fuzzy clusters around one-meter temperature profiles (or median temperature profiles, or surface duct depth profiles, or normalized slope magnitude profiles) of the filtered data profiles, computing percent memberships in the fuzzy clusters, aggregating a group of multiple parameter profiles of the fuzzy clusters, and providing the fuzzy clusters, the computed percent memberships, and the aggregated group in a computer-readable format. The method can optionally include the steps of determining missing salinity values of the one-meter temperature profiles, and applying the missing values in the step of creating the fuzzy clusters. The method can further optionally include the steps of filtering the filtered data profiles according to further pre-selected criteria, creating further fuzzy clusters around the one-meter temperature profiles of the twice-filtered data profiles, computing percent memberships in the further fuzzy clusters, and providing the further fuzzy clusters in the computer-readable format.

One advantage of the present teachings is that clustering can be freed from the limitations of previously-used parameters, and clustering can be done on mixed physical data. Another advantage of this method, in comparison to the use of Nydis, is the shorter time required for analysis of a set of profiles. This method also enables customization of a clustering analysis.

DETAILED DESCRIPTION

Figure 1:
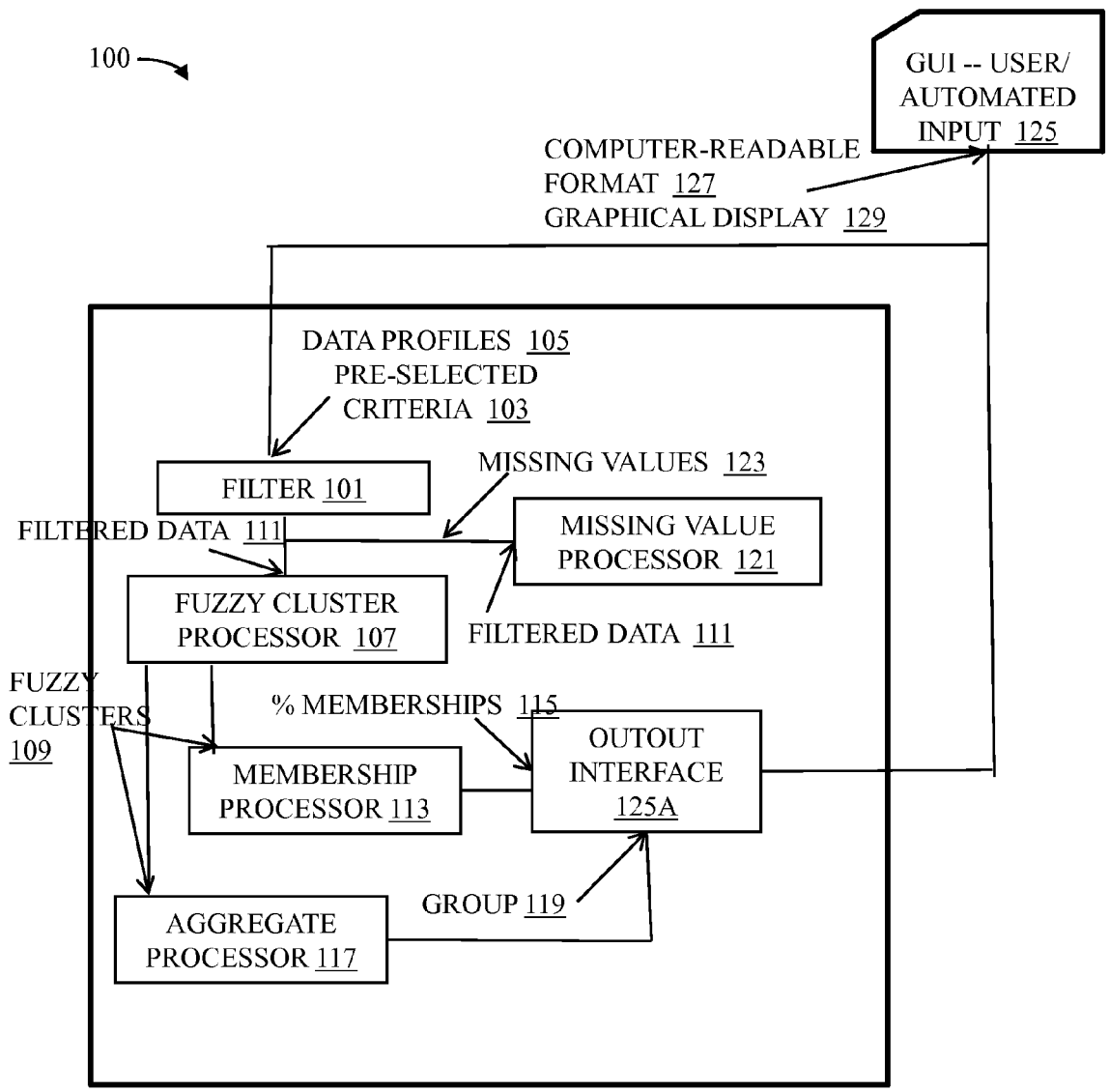
FIG. 1 is a schematic block diagram of the system of the present embodiment.

The aspects and features of the present teachings summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present teachings can provide a computer-implemented method for clustering particular kinds of data. As will be appreciated by one skilled in the art, clustering data in accordance with the present teachings can be accomplished by executing one or more sequences of instructions contained in computer-readable program code read into a memory of one or more general or special-purpose computers configured to execute the instructions.

The system and method of the present embodiment can include an automated method to cluster physical oceanographic profiles of one-meter temperature, median temperature, surface duct depth, and normalized slope magnitude, to provide these profiles spatially and seasonally, and to enable the user examine the profile clusters. The first step in the method is to obtain physical oceanographic profiles by, for example, a variety of instruments and recorded, for example, in several formats. The present embodiment can ingest data files written in either the World Oceanography Database format established by the National Oceanographic Data Center or the NAVO format established for the MOODS database. Another step in the method is to select profiles that lie with the desired area and time period. In the present embodiment, the ingested profiles are selected if their geographic positions are within selected latitude and longitude boundaries. The resulting areas may be as large as the whole Earth or as small as a single point. Profiles may also be selected according to their acquisition time or time-of-year. Time boundaries can be selected, for example, to be within specified months or seasons. A further step in the method is to calculate sound speed from temperature data, if the sound speed data are needed. A salinity profile can be extracted from, for example, the NAVO GDEM database from the same position and time of year as the temperature profile. Having salinity, the sound speed can be calculated using, for example, the Chen-Millero-Li algorithm or the DeGrasso algorithm. An optional step in the method can include selecting oceanographic parameters to cluster on that are independent from each other.

Another step in the method can be to fuzzy cluster the data for each desired number of profiles. For a specific number of clusters chosen by the user, fuzzy clustering can iteratively compute the centroid of each cluster. Fuzzy clustering can then assign, for each profile, a percentage membership greater than zero in each cluster such that the total membership for the profile is one hundred percent. Rather than forcing the analysis function to make each point belong to a particular cluster, fuzzy cluster analysis lets the points have partial memberships. Fuzzy cluster analysis finds the degree of membership of a data point in each cluster, with the caveat that the sum of the memberships for a point must equal unity and that the point has to have a measurable membership in each cluster. In the present embodiment, clustering algorithms developed by C. Borgelt, downloadable from http://www.borgelt.net/cluster.html, can be used. In clustering of littoral oceanographic areas of interest, temperature profiles can vary over time and place widely, and do vary widely throughout available historical measurements available. To get an understanding of the underlying environmental forcing mechanisms, dividing the data into areas and seasons of similar profiles can help explain the environmental variability and forcing functions.

A further step taken by the method is to select profiles for each cluster according to their percent membership in each cluster. The selection threshold can vary according to the total number of clusters selected. The default cluster threshold can be set, for example, at 100/n+10 percent, where n is the number of clusters. A profile can become a member of a cluster, for example, if its percent membership in that cluster is greater than the threshold. In the present embodiment, the threshold can change. Another step taken by the method is to produce plots for each desired total number of clusters. The first plot can be, for example, a color-coded map showing the location of each profile found to belong in a cluster. The symbol and color representing each profile can correspond, for example, to the cluster to which the profile belongs. For each cluster, a plot can be created, for example, that displays all of a particular parameter in the cluster. The plot can also include a canonical profile, i.e. the profile with the highest cluster membership for that cluster, the average of profiles, the average plus three standard deviations, and the average minus three standard deviations. The standard deviation criterion can vary in the present embodiment.

Optionally, the data may be split by season and reclustered. The map of the initial clustering may show areas where two or more clusters overlap. The dates of profiles present in each cluster can be examined, and it can be determined whether profiles are clustered in the overlapping region according to time (e.g., seasonally). Depending upon the results, the original profiles may be split by time and re-clustered.

The system and method of the present teachings can also include a computer program product including a computer-usable medium having computer-readable program code embodied thereon, the computer-readable program code adapted to be executed to implement a method for transforming raw data points into clusters of data in accordance with one or more aspects described herein.

Referring now to FIG. 1, system 100 for clustering data can include, but is not limited to including, filter 101 filtering data profiles 105 according to pre-selected criteria 103, fuzzy cluster processor 107 creating fuzzy clusters 109 around normalized slope magnitude profiles based on the filtered data profiles 111, membership processor 113 computing percent memberships 115 in fuzzy clusters 109, and aggregate processor 117 creating and aggregating a group 119 of multiple parameter profiles of fuzzy clusters 109. Fuzzy cluster processor 107, membership processor 113, and aggregate processor 117 can provide fuzzy clusters 109, computed percent memberships 115, and aggregated group 119 in computer-readable format 127. System 100 can optionally include missing salinity values processor 121 determining missing salinity and sound speed values 123 of the one-meter temperature profiles. Fuzzy cluster processor 107 can apply missing values 123 to create fuzzy clusters 109. System 100 can further optionally include graphical user interface 125 receiving pre-selected criteria 103 and data profiles 105. Graphical user interface 125 can provide, through output interface 125A, computer-readable format 127 as at least one graphical display 129.

Figure 2:
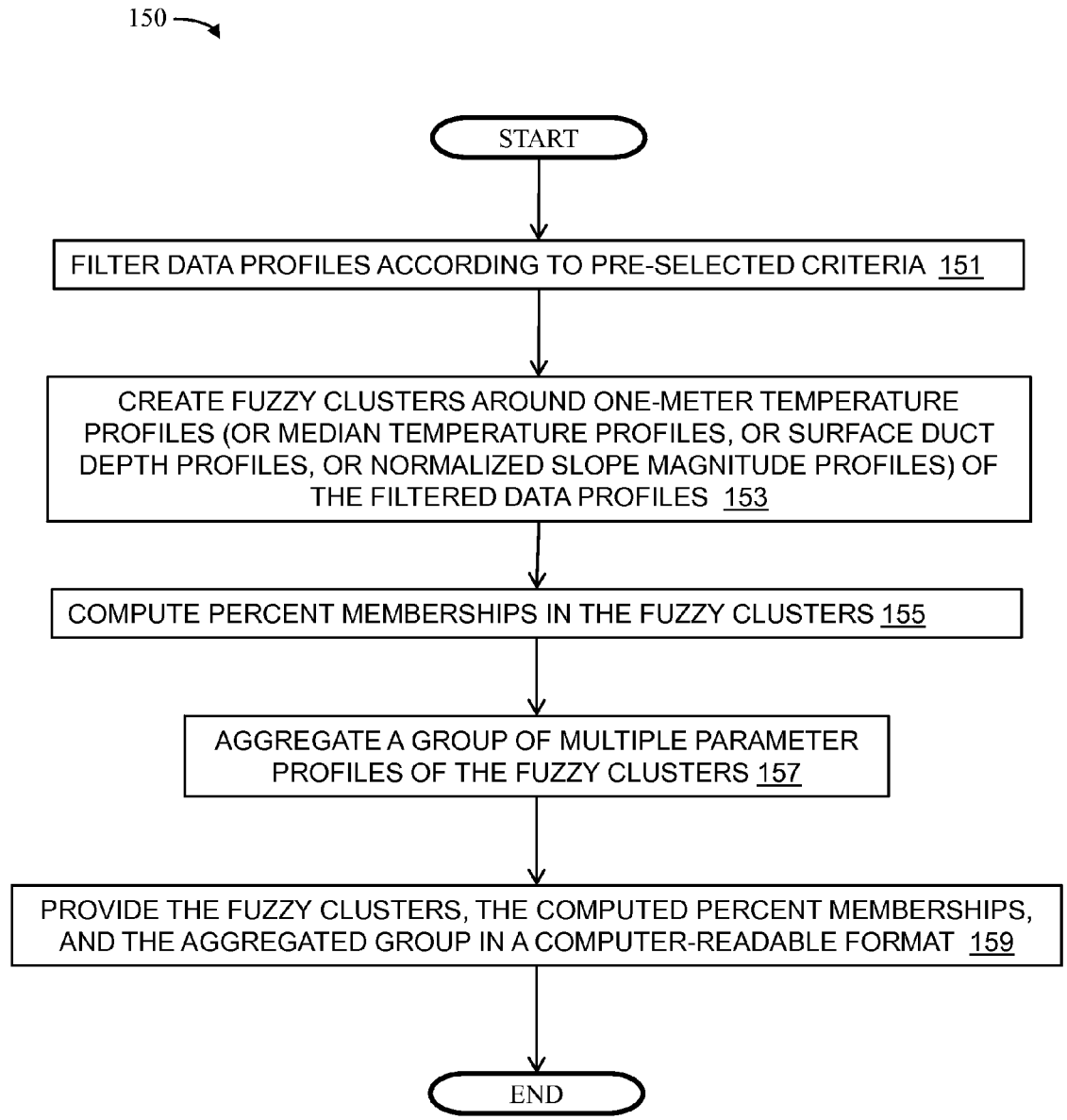
FIG. 2 is a flowchart of the method of the present embodiment.

Referring now to FIG. 2, method 150 for clustering data can include, but is not limited to including, the steps of filtering 151 data profiles according to pre-selected criteria, creating 153 fuzzy clusters around one-meter temperature profiles (or median temperature profiles, or surface duct depth profiles, or normalized slope magnitude profiles) of the filtered data profiles, computing 155 percent memberships in the fuzzy clusters, aggregating 157 a group of multiple parameter profiles of the fuzzy clusters, and providing 159 the fuzzy clusters, the computed percent memberships, and the aggregated group in a computer-readable format. The method can optionally include the steps of determining missing salinity values of the one-meter temperature profiles, and applying the missing values in the step of creating the fuzzy clusters. The method can further optionally include the steps of filtering the filtered data profiles according to further pre-selected criteria, creating further fuzzy clusters around the one-meter temperature profiles of the twice-filtered data profiles, computing percent memberships in the further fuzzy clusters, and providing the further fuzzy clusters in the computer-readable format.

It should be noted that one or more aspects of system 100 and method 150 for clustering data as described herein can be accomplished by one or more processors executing one or more sequences of one or more computer-readable instructions read into a memory of one or more computers from volatile or non-volatile computer-readable media capable of storing and/or transferring computer programs or computer-readable instructions for execution by one or more computers. Volatile media can include a memory such as a dynamic memory in a computer. Non-volatile computer readable media that can be used can include a compact disk, hard disk, floppy disk, tape, magneto-optical disk, PROM (EPROM, EEPROM, flash EPROM), SRAM, SDRAM, or any other magnetic medium; punch card, paper tape, or any other physical medium such as a chemical or biological medium.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. Such embodiments are also contemplated to be within the scope and spirit of the present disclosure.

What is claimed is:

1. A method for clustering data comprising:
   filtering data profiles according to pre-selected criteria, the filtered data profiles including information about a temperature at each of a number of meter steps;
   computing normalized slope magnitude profiles by summing the magnitude of the difference in the temperature between each of the meter steps in each of the filtered data profiles and dividing the sum by the number of the meter steps;
   creating fuzzy clusters around the normalized slope magnitude profiles of the filtered data profiles;
   computing percent memberships in the fuzzy clusters;
   aggregating a group of multiple parameter profiles of the fuzzy clusters; and
   providing the fuzzy clusters, the computed percent memberships, and the aggregated group in a computer-readable format.

2. The method as in claim 1 further comprising:
   determining missing salinity values of the filtered data profiles; and
   applying the missing salinity values to derive sound speed values.

3. The method as in claim 1 further comprising:
   filtering the filtered data profiles according to further pre-selected criteria;
   creating further fuzzy clusters around the normalized slope magnitude profiles of the twice-filtered data profiles;
   computing percent memberships in the further fuzzy clusters; and
   providing the further fuzzy clusters in the computer-readable format.

4. The method as in claim 1 further comprising:
   receiving the pre-selected criteria; and
   providing the computer-readable format as at least one graphical display.

5. A system for clustering data comprising:
   a filter filtering data profiles according to pre-selected criteria, the filtered data profiles including information about a temperature at each of a number of meter steps;
   a fuzzy cluster processor creating fuzzy clusters around normalized slope magnitude profiles based on the filtered data profiles, the normalized slope magnitude profiles being computed by summing the magnitude of the difference in the temperature between each of the meter steps in each of the filtered data profiles and dividing the sum by the number of the meter steps;
   a membership processor computing percent memberships in the fuzzy clusters; and an aggregate processor aggregating a group of multiple parameter profiles of the fuzzy clusters, wherein said fuzzy cluster processor, said membership processor, and said aggregate processor provide the fuzzy clusters, the computed percent memberships, and the aggregated group in a computer-readable format.

6. The system as in claim 5 further comprising:

a missing values processor determining missing values of the filtered data profiles, wherein said fuzzy cluster processor applies the missing values to create the fuzzy clusters.

7. The system as in claim 5 further comprising:

a graphical user interface receiving the pre-selected criteria and the data profiles, said graphical user interface providing the computer-readable format as at least one graphical display.

8. The system as in claim 5 further comprising:

an electronic interface automatically receiving the pre-selected criteria and the data profiles.

* * * * *